Feb. 10, 1942. W. H. VOGT ET AL 2,272,257
TIME CYCLE SYSTEM
Filed Oct. 3, 1941
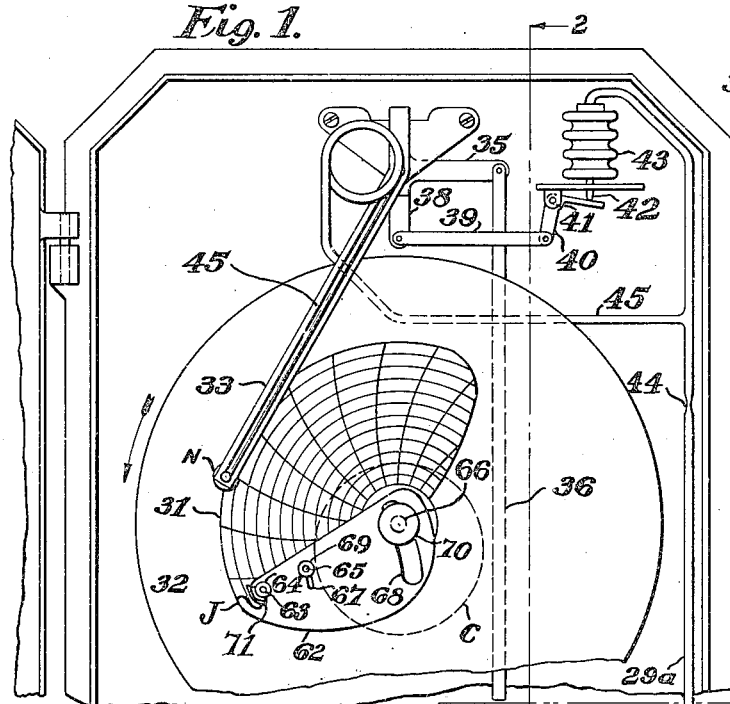
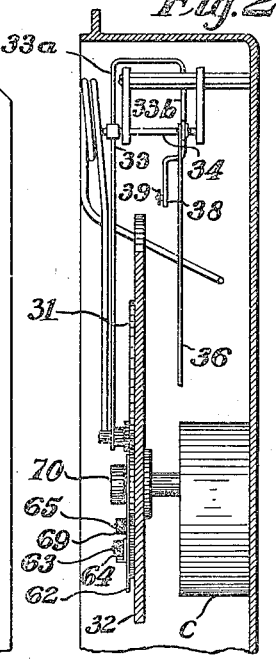
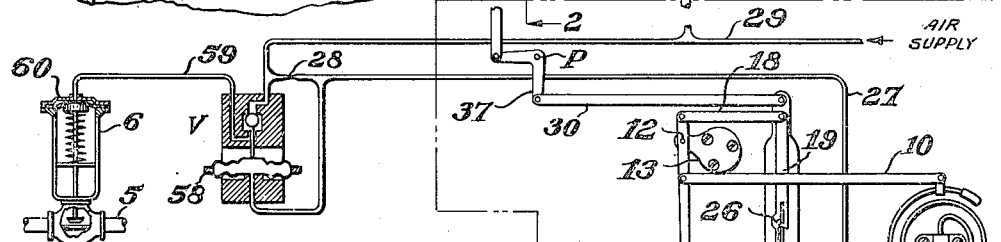
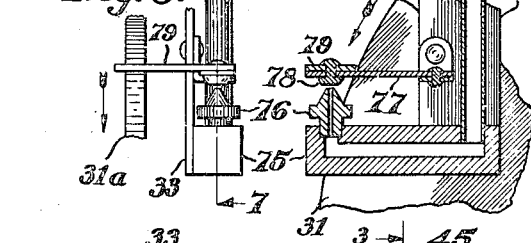
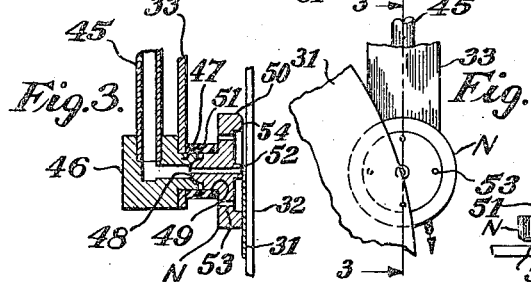
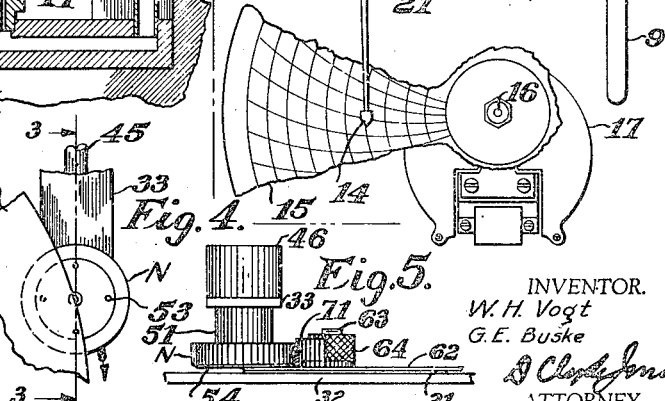
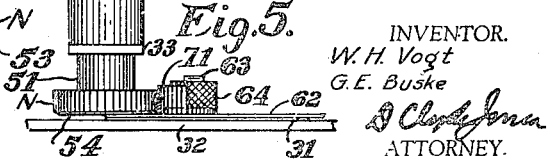
INVENTOR.
W. H. Vogt
G. E. Buske
ATTORNEY.

Patented Feb. 10, 1942

2,272,257

UNITED STATES PATENT OFFICE 2,272,257

TIME CYCLE SYSTEM

William H. Vogt and Gilbert E. Buske, Rochester, N. Y., assignors to Taylor Instrument Companies, Rochester, N. Y., a corporation of New York Application October 3, 1941, Serial No. 413,478

8 Claims. (Cl. 161—1)

This invention relates to a time cycle device for use in a time schedule control system whereby a variable condition such as temperature, pressure or the like is controlled according to a predetermined schedule.

It has been customary in such time cycle devices to employ a clock-operated cam for forcing a cam follower into various preselected positions in order to adjust the set point of the controlling instrument according to a predetermined schedule.

In such former devices with the exception of that disclosed in the patent to Foote No. 2,050,753, granted August 11, 1936, there was a definite limitation on the amount of condition change that could be effected in a given interval. This limitation rose from the fact that a desired abrupt increase in condition change required an abrupt change or steep rise in the cam contour, with the result that the cam follower instead of riding up this abrupt surface would bind and the control system would be rendered entirely ineffective. However, in the mentioned Foote patent it was proposed to utilize a source of auxiliary power for lifting the cam follower up the steep cam rise. Thus it was not necessary to rely on the cam motor and the cam to raise the follower so that there was no danger of the follower binding on the cam. In the arrangement of the mentioned patent, the auxiliary source of power included a pneumatic motor which was governed by a baffle and nozzle control couple located at a point remote from the cam follower, so that it was necessary to utilize a linkage for transmitting the control effect of the follower to the control couple. Furthermore, in the arrangement of that patent, as well as in former devices, it has been necessary to fashion the cam from rigid material such as metal, thereby necessitating machining or filing operations to develop the desired cam contour.

In accordance with the main feature of the present invention there is provided a time cycle device in which pneumatically operated exploring means carried on the free end of the follower arm follows the contour of the timing cam.

Another feature of one modification of the invention relates to the construction of a time cycle device whereby a circular paper chart of the type normaly used in a recorder can be cut to any desired outline to function as a timing cam.

Other features and advantages of the invention will appear from the detailed description and claims when taken with the drawing in which:

Fig. 1 is a showing, partially schematic, of the time cycle device of the invention incorporated in a time-temperature controlled system of the pressure fluid operated type;

Fig. 2 is a vertical sectional view taken on the line 2—2 of Fig. 1;

Fig. 3 is a section on the line 3—3 of Fig. 4; and

Fig. 4 is a detail view showing the face of the nozzle and its relation to the cam 31;

Fig. 5 is a side view of the nozzle and a portion of a composite cam showing especially the arangement for causing the nozzle to pass from the adjustable part of the cam to the fixed part thereof;

Fig. 6 is a side view of a modified form of the invention in which the nozzle and baffle both follow the contour of the cam; and Fig. 7 is a section taken on the line 7—7 of Fig. 6.

The invention is herein illustrated as applied to a system in which it is desired to control temperature according to a predetermined schedule, although it is also applicable to time-schedule systems for controlling pressure, rate of flow liquid level and like conditions. In the middle left-hand portion of Fig. 1 there is illustrated a pipe 5 through which a temperature controlling medium such as steam, hot water or even refrigerated brine is conducted to a region or chamber (not shown), the temperature of which is to be controlled. The flow of this medium through the pipe 5 is effected under the control of a diaphragm type of motor valve generally designated 6, the operation of which is governed by a regulating instrument R of any well-known construction in which the "control temperature" or "set point" is adjustable. As here-in illustrated, the regulating instrument is provided with a thermosensitive tube system comprising a Bourdon spring 7 communicating through a capillary tube 8 with a bulb 9 located in the mentioned chamber or region, the temperature of which is to be controlled. It will be understood that the tube system is filled with any well-known thermosensitive filling medium. One end of this Bourdon spring is fixed to the frame of the instrument (not shown) while the other end thereof which is free, is connected by a link 10 to an intermediate point on the pen arm 11. This pen arm is pivotally mounted at 12 by means of a suitable bracket 13 and is provided at its lower end, as illustrated, with a stylus 14 in operative relation to a graduated chart 15 which is attached to the arbor 16 of a suitable clock mechanism 17. The upper end of the pen arm is connected by a link 18 to a baffle actuating lever 19 pivoted at 20 on a suitable bracket 21 carried by the instrument frame. There is also mounted on the pivot 20 an arm 22 on which there is pivotally supported a baffle 23, the lower end of which baffle tends to swing counterclockwise, under the influence of a counterweight 24, toward a fixed nozzle 25. The lever 19 which is partially broken away to show the baffle 23 more clearly, carries a pin 26 projecting in a position to engage the upper end of the baffle 23. By this arrangement when the lever 19 swings clockwise the projecting pin 26 thereon also swings the baffle 23 clockwise so that its lower end recedes from the nozzle 25. The nozzle communicates with the conduit 27 which, in turn, is connected through the constriction 28 to the pressure fluid supply conduit 29. It will be noted that conduit 27, the pressure in which is controlled by the relative position of the baffle 23 and the nozzle 25, terminates in a capsular chamber or bellows 58 which actuates the relay valve V interposed in the conduit 59 leading to the motor diaphragm top 60 of the valve 6. The pivoted arm 22, which carries the pivoted baffle 23, is connected by a link 30 to a time cycle device. The mechanism thus far described may be of any conventional type and the specific arrangement herein shown is merely for purposes of description.

In order to change the controlled temperature value or the set point of the instrument R, it is necessary to move the link 30 to the right or to the left as the occasion demands. In the past this has been accomplished by a pivoted cam follower arm provided at its free end with a follower engaging the periphery of a cam cut to a predetermined time schedule, the cam being rotated in accordance with the passage of time by a suitable clock similar to that indicated at C in Figs. 1 and 2. Since such a follower actually contacted the peripheral surface of the cam, it was necessary to fashion the cam from metal or other rigid material, having substantial thickness, with the result that machining or filing operations were necessary in preparing the variously shaped cams that were required.

In accordance with the modification of the invention illustrated in Figs. 1 to 4, it is proposed to replace the metal cam of the prior art by a paper cam 31 which is cut from a paper recorder chart and which is then glued to the face of a rigid disc 32. This disc is rotated in accordance with the passage of time by means of the clock C. In this arrangement, the usual cam follower is eliminated and instead, there is employed an exploring nozzle generally designated N (Figs. 3 and 4) either in contact with or substantially in contact with the paper cam 31 and having its nozzle opening directing a jet of air preferably in a direction perpendicular to the plane of the cam which serves as a baffle to control the escape of air through the nozzle. The nozzle is carried on the lower end of a nozzle arm 33 having its upper end bent into U-shaped form to provide supporting portions 33a and 33b. These supporting portions have alined bearings thru which there passes a fixed arbor 34 on which the nozzle arm can swing. The supporting portion 33b of the nozzle arm has an extension 35 to which there is connected, one end of a link 36. The other end of this link is connected to one arm of a bell crank 37, mounted on a fixed pivot P. The other arm 78 of this bell crank 37 is connected to one end of the previously mentioned link 30 for actuating the same in a direction to change the set point or control point of the controller R. The supporting portion 33b also is provided with a second extension 38, having one end of the link 39 attached thereto. The other end of this link is connected to one arm of a bell crank 40, which is mounted on a fixed pivot 41. The other arm of this bell crank extends in a position to be engaged by the lug 42 carried on the movable end of a bellows 43. This bellows communicates through the restriction 44 and thru the conduits 29a and 29 with the compressed air source. It has been mentioned that the nozzle has a jet of compressed air constantly escaping therefrom. The compressed air source is also supplied to the branch conduit 29a, restriction 44, conduit 45 which is coiled adjacent the arbor 34, from which point this conduit extends along the pivoted arm 33 and communicates with the nozzle N.

While various nozzle arrangements may be employed, it is preferred to use the construction illustrated in Figs. 3 and 4. In this arrangement, the nozzle N comprises a connection elbow 46 having a stem 47 to extend through an opening near the free end of the nozzle arm 33. The free end of the stem 47 is shaped to provide a socket cooperating with a ball 48 formed on the lug 49 located at the center of the rear surface of the nozzle disc 50. A collar 51 of flexible material, such as rubber, couples the stem 47 and the lug 49 in air-tight relation and yet permits the nozzle disc 50 to have universal movement with respect to the elbow 46. The face of the disc 50 is provided with a raised rim 54 (Fig. 3) and its center portion is provided with a perforated tip 52, the end of the tip and the edge of the rim preferably lying in the same plane. The perforated tip communicates with the branch conduit 45 through the lug 49 and the connection elbow 46. It will be noted that the nozzle disc is provided with several openings 53 therein extending from within the rim to points outside of the flexible collar. Thus, air, escaping through the perforated tip, will not accumulate in the space between the paper cam 31 and the disc 50.

In the operation of the device, let it be assumed that a paper chart having been cut to a predetermined outline to form a cam 31, has been glued to the circular plate 32 and that this plate is being rotated by a suitable clock C. A source of compressed air is supplied through the conduit 29. Some of this air flows through the branch conduit 29a, restriction 44, branch conduit 45 and through the tip 52 of the nozzle N. If the aperture in the perforated tip 52 is completely closed off due to the fact that the nozzle is completely over the face of the paper cam, the amount of air escaping through the nozzle will be reduced. This will cause the pressure to increase in the branch conduit and in the bellows 43. This bellows will then expand and its pin 42 will force the bell crank 40 in a clockwise direction. Crank 40 acting through the link 39 will swing the nozzle arm 33 in a clockwise direction until the opening through the tip 52 of the nozzle N is directly over the edge of the paper cam. In the event that the opening in the tip is completely off of the paper cam, then an excess amount of air will escape through the nozzle N. The bellows 43 will tend to contract thereby permitting the coil in the conduit to swing the nozzle in a counter-clockwise direction until the perforated tip 52 of the nozzle N has its opening directly over the edge of the paper cam. It will be understood that as the nozzle arm 33 is positioned in the manner just described it will likewise operate through the link 36, bell crank 37 and link 30 to change correspondingly the set point of the controller R.

By this arrangement, it will be understood that a cam can be quickly made by trimming a chart to the desired outline simply by the use of a scissors and this operation can be performed even by an unskilled workman. In this arrangement, the contour of the cam can be abrupt since there is no danger of binding between the surface of the cam and the follower arm. Also, the amount of friction is reduced since the nozzle does not bear heavily on the cam so that the parts can be made of less sturdy material.

In certain installations, it is necessary to change the time schedule frequently with a consequent new cam contour for each new schedule. As shown especially in Figs. 1 and 5, the cam 31 may have its contour supplemented by a cam segment 62, preferably made of a rigid sheet material adapted to be superimposed on the cam 31 so that the contours of the two parts merge to provide a composite cam. The segment is adjustable about a pin 63 projecting at right angles from the supporting plate 32. This pin is threaded and is adapted to pass through an opening in the cam segment, which is retained on the threaded pin by a nut 64. The cam segment is adjustable about this pin and is retained against the plate 32 in adjusted position, by clamping bolt 65 mounted on plate 32 to pass through the arcuate slot 67 in the segment for engagement with the clamping nut 69. As herein illustrated, the segment has a second slot 68 therein to receive the clock arbor hub 66 which is provided with a retaining nut 70. It will be understood that the nozzle N cooperates with the edge of the segment 62 following the contour thereof until this contour merges at J with the contour of the cam 31. Inasmuch as the nozzle N, if unguided, would continue to follow the contour of the cam segment, instead of passing from the cam segment to the cam 31 at the junction J, means have been provided to effect this transfer. In order to accomplish this result, there is mounted on the pin 63 a raised guide 71 adapted to be engaged by the rim of the nozzle N when the nozzle is at the junction J. This guide directs the nozzle from the edge of the cam segment to the edge of the cam 31 at this junction J. With this arrangement it will be understood that the cam segment may be adjustably moved about the pin 63 after the clamping nut 69 has been loosened, so that the composite cam may correspond to various time schedules. After the adjustment of the cam segment has been effected, the clamping nut is tightened to retain the segment in the adjusted position. It will be understood that the composite cam including the cam segment 62 and the cam 31, governs the operation of the time cycle device in the manner already described.

While the arrangement in which the nozzle alone follows the periphery of the timing cam, is especially useful where the cam is cut from a paper chart, the invention is also adapted for use with a rigid timing cam 31a, as disclosed in the modification of the invention illustrated in Figs. 6 and 7. In this arrangement the follower arm 33 is provided with a hollow fixture 75 which carries a nozzle 76 adjacent the periphery of the cam, the nozzle communicating through the hollow fixture with a conduit 45. In this modification the nozzle directs its jet of escaping air in a direction parallel to the plane of the cam 31a. The follower arm 33 has mounted thereon, a somewhat flexible baffle support 77, which carries a baffle 78 close to the nozzle 76. The baffle support, at a point adjacent the nozzle, is provided with a finger 79 engaging the periphery of the cam 31a. It will be seen especially from Fig. 7 that when the cam rotates in the direction of the arrow, the finger engages the edge of the cam and tends to swing the baffle toward the nozzle. This reduces the escape of compressed air through the nozzle, so that pressure builds up in the bellows 43. The bellows 43 operates in the manner already described to swing the follow- arm 33 clockwise until the finger 79 only lightly engages the edge of the cam. The remainder of this modified time cycle device operates in the manner already described.

What we claim is:

1. In a time cycle device, a cam having an outline corresponding to a predetermined schedule, means including a nozzle mounted to follow the outline of said cam, a source of pressure fluid communicating with said nozzle, means including the edge of said cam for varying the fluid pressure in said nozzle, means responsive to said varying pressure for positioning said nozzle with respect to said cam, and means adjusted in accordance with the movement of said nozzle.

2. In a time cycle device, a cam having an outline corresponding to a predetermined schedule, said cam comprising flexible sheet material such as paper cut to a desired cam outline and mounted on a rigid support, means including a nozzle mounted to follow the outline of said cam, a source of pressure fluid communicating with said nozzle, means including the edge of said cam for varying the fluid pressure in said nozzle, means responsive to said varying pressure for positioning said nozzle with respect to said cam, and means adjusted in accordance with the movement of said nozzle.

3. In a time cycle device, a cam having an outline corresponding to a predetermined schedule, means including a nozzle mounted to follow the outline of said cam, a source of pressure fluid communicating with said nozzle, said nozzle directing a jet of air in a direction generally normal to the plane of said cam, means including the edge of said cam for varying the fluid pressure in said nozzle, means responsive to said varying pressure for positioning said nozzle with respect to said cam, and means adjusted in accordance with the movement of said nozzle.

4. In a time cycle device, a nozzle connectable to a source of pressure fluid, a baffle cooperating with said nozzle to vary the escape of pressure fluid therethrough, means including a clock for rotating said baffle unidirectionally in accordance with the passage of time, and means adjusted in response to the varying fluid pressure in said nozzle.

5. In a time cycle device, a composite cam having a main portion and an adjustable portion superimposed thereon to provide various outlines corresponding to different predetermined schedules, said cam having a junction where the outline of one portion merges with that of the other portion, means including a nozzle mounted to follow the outline of said cam, means for guiding said nozzle from the edge of one portion to that of the other at said junction, a source of pressure fluid communicating with said nozzle, said nozzle directing a jet of air in a direction generally normal to the plane of said cam, means including the edge of said cam for varying the fluid pressure in said nozzle, means responsive to said varying pressure for positioning said nozzle with respect to said cam, and means adjusted in accordance with the movement of said nozzle.

6. In a time cycle device, a cam having an outline corresponding to a predetermined schedule, means including a nozzle and a baffle in cooperative relation therewith both mounted to follow the outline of said cam, a source of pressure fluid communicating with said nozzle, means including the edge of said cam for varying the space between said nozzle and said baffle and therefore the fluid pressure in said nozzle, means responsive to said varying pressure for positioning said nozzle with respect to said cam, and means adjusted in accordance with the movement of said nozzle.

7. In a time cycle device, a cam having an outline corresponding to a predetermined schedule, means including a baffle in cooperative relation therewith both mounted to follow the outline of said cam, said nozzle directing a jet of air parallel to the plane of said cam, said baffle being supported with its principal plane perpendicular to that of said cam, a source of pressure fluid communicating with said nozzle, means including the edge of said cam for varying the space between said nozzle and said baffle and therefore the fluid pressure in said nozzle, means responsive to said varying pressure for positioning said nozzle with respect to said cam, and means adjusted in accordance with the movement of said nozzle.

8. In a time cycle device, a cam having an outline corresponding to a predetermined schedule, means including a baffle in cooperative relation therewith both mounted to follow the outline of said cam, said nozzle directing a jet of air parallel to the plane of said cam, said baffle being supported with its principal plane perpendicular to that of said cam, a source of pressure fluid communicating with said nozzle, means carried with said baffle and engaging the periphery of said cam for varying the space between said nozzle and said baffle and therefore the fluid pressure in said nozzle, means responsive to said varying pressure for positioning said nozzle with respect to said cam, and means adjusted in accordance with the movement of said nozzle.

WILLIAM H. VOGT.
GILBERT E. BUSKE.